US012060732B2

(12) United States Patent
Chen et al.

(10) Patent No.: US 12,060,732 B2
(45) Date of Patent: Aug. 13, 2024

(54) LOCKING DEVICE

(71) Applicant: KING SLIDE TECHNOLOGY CO., LTD, Kaohsiung (TW)

(72) Inventors: Ken-Ching Chen, Kaohsiung (TW); Chun-Ta Liu, Kaohsiung (TW); Hsin-Cheng Su, Kaohsiung (TW); Shu-Chen Lin, Kaohsiung (TW)

(73) Assignee: King Slide Technology Co., Ltd., Kaohsiung (TW)

(*) Notice: Subject to any disclaimer, the term of this patent is extended or adjusted under 35 U.S.C. 154(b) by 105 days.

(21) Appl. No.: 17/845,336

(22) Filed: Jun. 21, 2022

(65) Prior Publication Data

US 2023/0295962 A1 Sep. 21, 2023

(51) Int. Cl.
*E05B 65/46* (2017.01)

(52) U.S. Cl.
CPC ...... *E05B 65/46* (2013.01); *A47B 2210/0016* (2013.01)

(58) Field of Classification Search
CPC .... A47B 2210/0016; A47B 2210/0018; A47B 88/50; A47B 88/473; A47B 88/477; A47B 88/457; A47B 88/0414; A47B 88/463; A47B 88/0477; A47B 88/46; E05B 63/22; E05B 65/46; E05B 65/462; E05B 65/463; Y10S 292/04
See application file for complete search history.

(56) References Cited

U.S. PATENT DOCUMENTS

| | | | | |
|---|---|---|---|---|
| 6,779,855 B2 * | 8/2004 | Hoffman | E05B 65/466 312/219 |
| 8,328,299 B2 | 12/2012 | Hashemi et al. | |
| 9,777,514 B2 * | 10/2017 | Haidvogl | E05B 17/005 |
| 2019/0063113 A1 | 2/2019 | Milligan et al. | |
| 2020/0018098 A1 * | 1/2020 | Chen | E05B 65/462 |
| 2020/0337456 A1 * | 10/2020 | Chen | A47B 88/46 |

FOREIGN PATENT DOCUMENTS

| | | | | | |
|---|---|---|---|---|---|
| CN | 110710807 | A * | 1/2020 | A47B 88/463 |
| CN | 110720768 | B | 5/2022 | |
| DE | 102012109751 | A1 * | 4/2014 | A47B 67/04 |
| DE | 102017121701 | A1 * | 3/2019 | A47B 88/45 |
| EP | 2272400 | A1 * | 1/2011 | A47B 88/463 |
| JP | 2005056349 | A | 3/2005 | |
| JP | 2005058349 | A | 3/2005 | |
| JP | 2022039726 | A | 3/2022 | |
| KR | 200407471 | Y1 * | 1/2006 | E05B 65/46 |
| TW | 201834590 | A | 10/2018 | |
| WO | 2007132638 | A1 | 11/2007 | |
| WO | 2021180516 | A1 | 9/2021 | |

* cited by examiner

*Primary Examiner* — Andrew Roersma
(74) *Attorney, Agent, or Firm* — Rosenberg, Klein & Lee

(57) ABSTRACT

A locking device is adapted for a first object and a second object that are movable with respect to each other. The locking device includes a first element and a second element. The first element can be in a locking state or an unlocking state. The second element drives the first element and thereby moves the first element from the locking state to the unlocking state in response to the second object being displaced with respect to the first object from a retracted position to a predetermined position in an opening direction.

16 Claims, 18 Drawing Sheets

LOCKING DEVICE

FIELD OF THE INVENTION

The present invention relates to a lock and more particularly to a locking device adapted for two objects that can be moved with respect to each other.

BACKGROUND OF THE INVENTION

Generally speaking, slide rail assemblies can be applied to rack systems that are used at home, in offices, or by electronic equipment. A slide rail assembly typically includes a first rail and a second rail that are respectively mounted on a first object and a second object, such as a cabinet body and a drawer so that the drawer can be pulled open or retracted via the second rail with respect to the first rail and/or the cabinet body. As user needs vary, however, it is sometimes undesirable to allow the second rail (the second object) to be operated at will, e.g., to be moved with respect to the first rail (the first object) from a predetermined position.

U.S. Pat. No. 8,328,299 B2, for example, discloses a drawer slide and locking mechanism, wherein the locking mechanism is an electronic lock. As can be seen in FIG. 1 of the '299 patent, the drawer slide includes an outer rail and an inner rail. The inner rail can be at a retracted position with respect to the outer rail, and the rear end of the inner rail is provided with a pin. The locking mechanism includes a latch receiver, a lever arm, and a motor. As shown in FIG. 1 and FIG. 2 of the '299 patent, the latch receiver can be at a first position, where the latch receiver is in a state in which it can catch the pin of the inner rail, and as shown in FIG. 3 of the '299 patent, the motor can drive the lever arm into rotation when receiving an electronic control signal so that the top portion of the lever arm is driven to push, and thereby rotate, the latch receiver from the first position to a second position, where the latch receiver locks the pin of the inner rail. The foregoing configuration is such that the inner rail can be locked at the retracted position with respect to the outer rail, i.e., kept from moving away from the retracted position with respect to the outer rail.

It is worth mentioning that the '299 patent also discloses a manual release member extending out of, or exposed from, the housing of the locking mechanism. When no electrical energy is supplied to the motor or when a related electronic component is damaged, the manual release member can be pulled by a user so as to drive the lever arm to an unlocking position, thereby bringing the latch receiver back to the first position to unlock the pin of the inner rail and hence allow the inner rail to be moved away from the retracted position.

As another example, US Published Patent Application No. 2019/0063113 A1 discloses an electronic lock in which a latch is controlled by a motor in order to be locked or unlocked. The '113 patent application also provides a lanyard for manually unlocking the components of the locking mechanism. By pulling the lanyard, a user can drive the latch from a locked position to an unlocked position.

Considering different user needs or the different structure activation methods in use, however, the locking functions disclosed in the foregoing patent and patent application are not always desired. Moreover, an electronic lock such as those cited above require a mechanical structure (e.g., the aforesaid manual release member) for carrying out a manual unlocking function, or more particularly for activating the unlocking mechanism with an externally applied force, when a power outage occurs or when a related electronic component is damaged. Therefore, the development of a different product from the above is an issue not to be ignored.

SUMMARY OF THE INVENTION

The present invention relates to a locking device that can be applied to a first object and a second object that can be moved with respect to each other.

According to one aspect of the present invention, a locking device is adapted for a first object and a second object that are movable with respect to each other. The locking device includes a first element and a second element. The first element can be moved between a locking state and an unlocking state. The second element drives the first element and thereby moves the first element from the locking state to the unlocking state in response to the second object being displaced with respect to the first object from a retracted position to a predetermined position in an opening direction.

According to another aspect of the present invention, a locking device is adapted for a piece of furniture that includes a first object, a second object, and a driving device. The first object and the second object can be moved with respect to each other, and the driving device is configured to allow the second object to be opened by being pushed with respect to the first object from a retracted position in a retracting direction. The locking device includes a first element and a control module. The control module is configured to drive the first element into either one of a locking state and an unlocking state. When the first element is in the locking state, the second object cannot be opened by being pushed with respect to the first object from the retracted position in the retracting direction. When the first element is in the unlocking state, however, the second object can be opened by being pushed with respect to the first object from the retracted position in the retracting direction.

According to yet another aspect of the present invention, a locking device is adapted for use with a communication device. The locking device includes a base, a first element, and a control module. The first element is movably mounted on the base. The control module includes a first electromagnet and a second electromagnet. When receiving an unlocking signal from the communication device, the control module moves the first element to an unlocking state via the first electromagnet. When receiving a locking signal from the communication device, the control module moves the first element to a locking state via the second electromagnet.

DETAILED DESCRIPTION OF THE INVENTION

Figure 1:
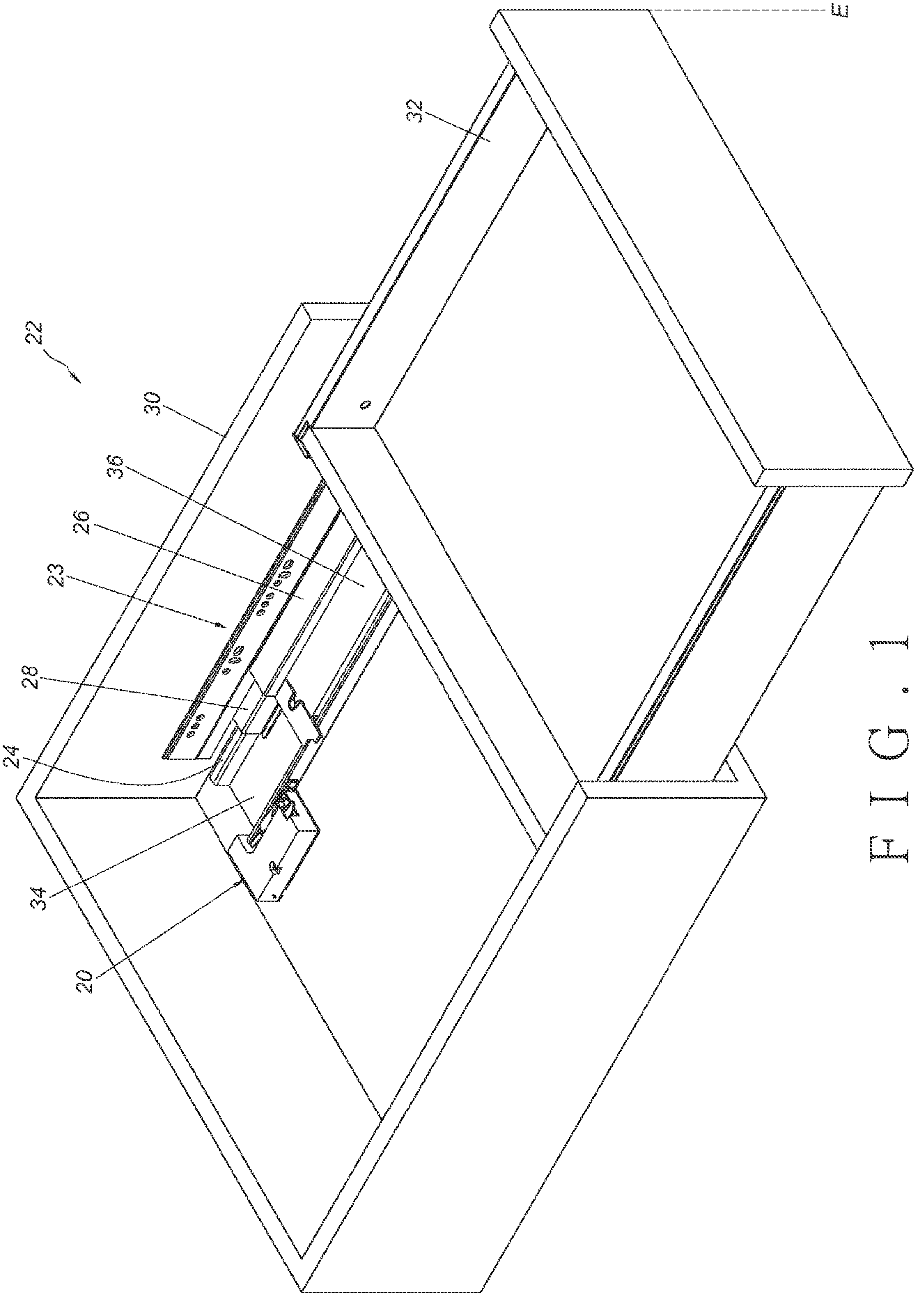
FIG. 1 is a perspective view showing the locking device according to an embodiment of the present invention applied to a piece of furniture.
Figure 2:
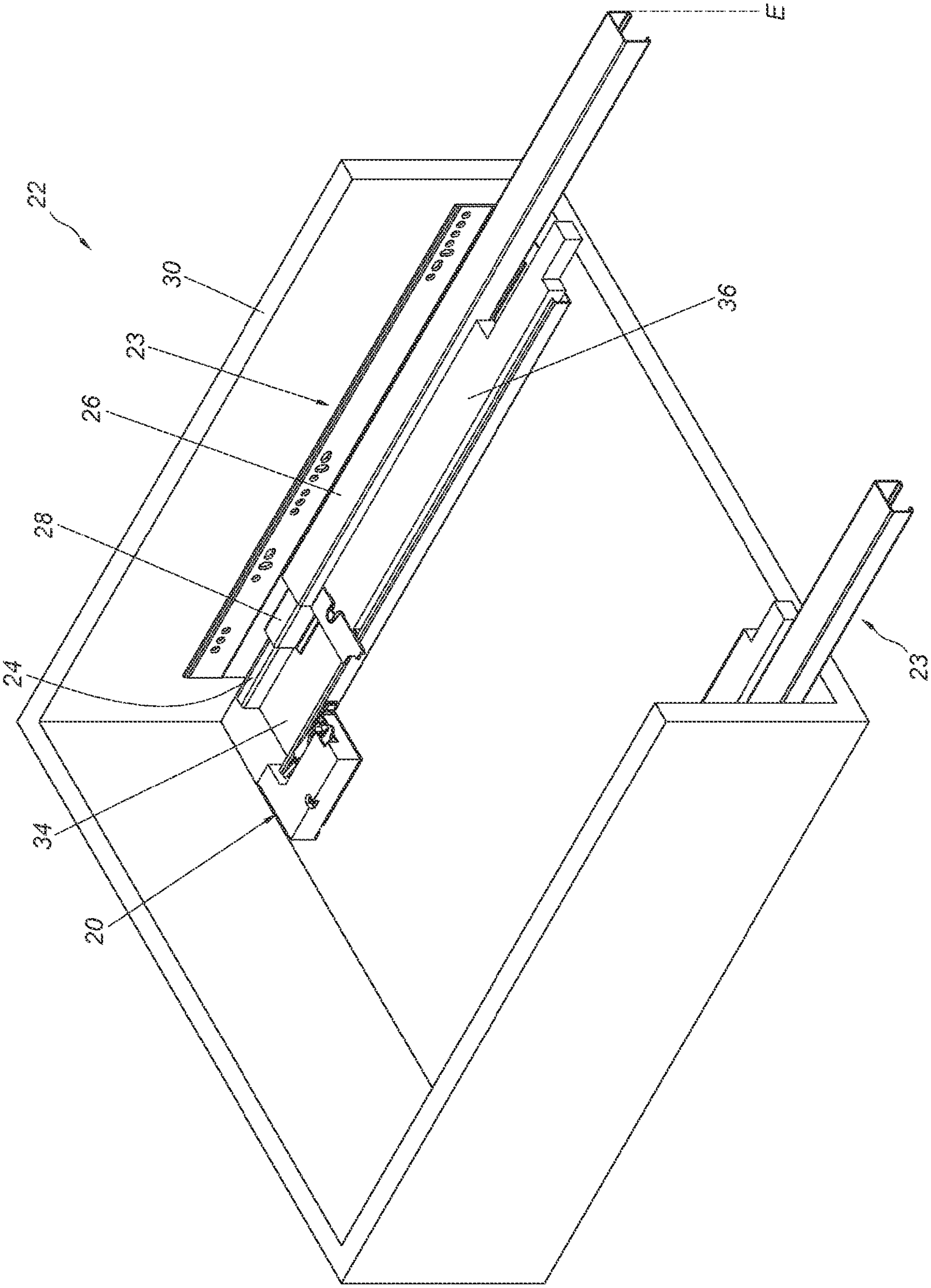
FIG. 2 is another perspective view showing the locking device according to the embodiment of the present invention applied to the furniture.

Referring to FIG. 1 and FIG. 2, the locking device 20 according to an embodiment of the present invention is, for example, a smart locking device or electronic lock adapted for a piece of furniture 22. The furniture 22 includes a first object 24 and a second object 26 that can be moved with respect to each other.

Preferably, the furniture 22 further includes a third object 28 movably mounted between the first object 24 and the second object 26. Here, by way of example, the first object 24 is a first rail (e.g., a fixed rail), the second object 26 is a second rail (e.g., a movable rail), and the third object 28 is a third rail (e.g., a middle rail). The present invention, however, has no limitation on the configuration of the first object 24, the second object 26, or the third object 28. The first object 24, the second object 26, and the third object 28 can be moved with respect to one another in a longitudinal direction and jointly constitute a slide rail assembly 23.

Preferably, the first object 24 is provided (e.g., fixed) on a cabinet body 30, and the second object 26 is configured to carry a drawer 32 so that the drawer 32 can be at an extended position E with respect to the first object 24 (or the cabinet body 30) thanks to the second object 26.

Preferably, the first object 24 includes an extension portion 34, and the second object 26 includes a carrying portion 36.

Figure 3:
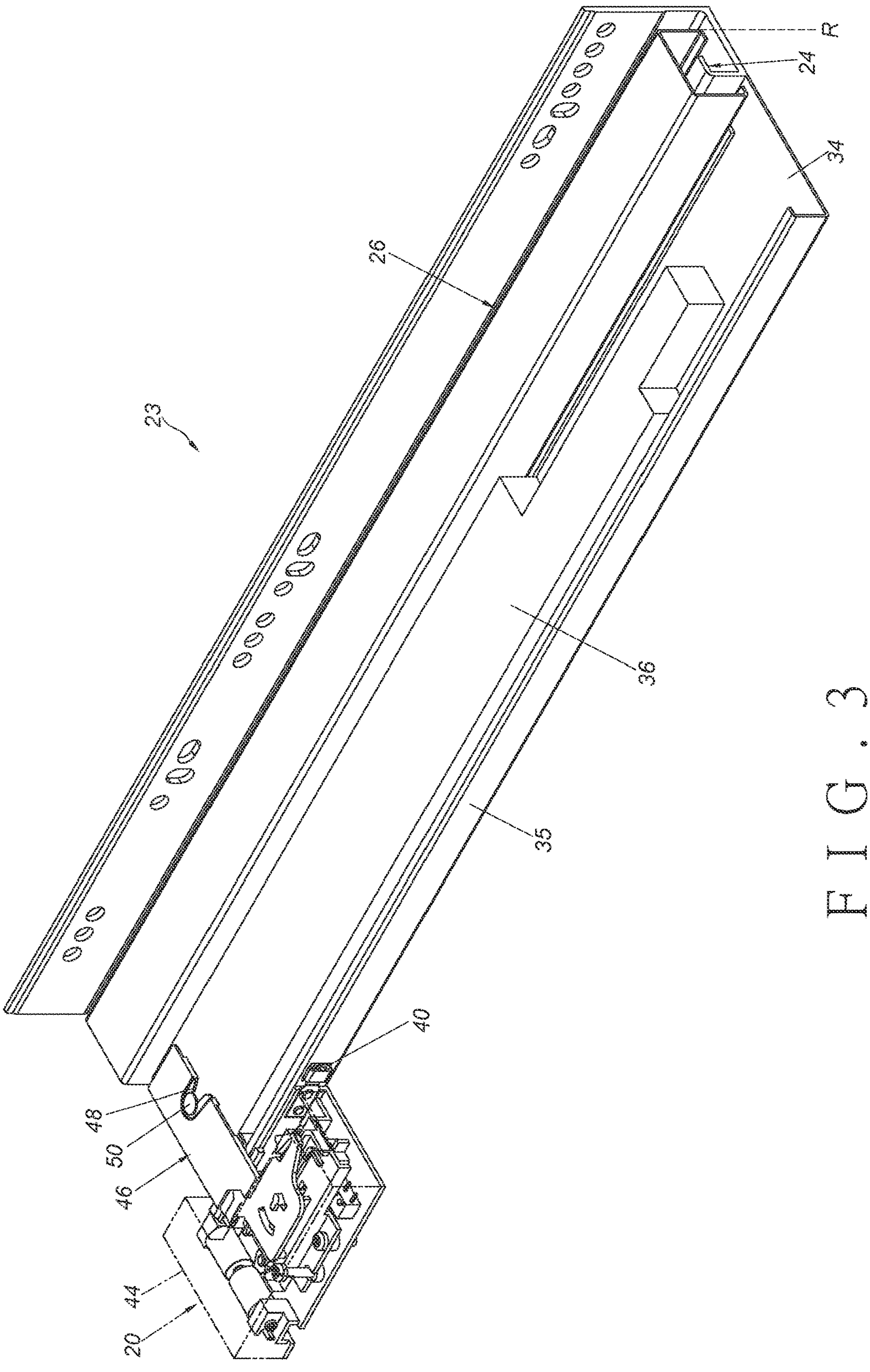
FIG. 3 is an assembled perspective view showing the locking device according to the embodiment of the present invention applied to a first object and a second object of the furniture, wherein the first and the second objects can be moved with respect to each other.
Figure 4:
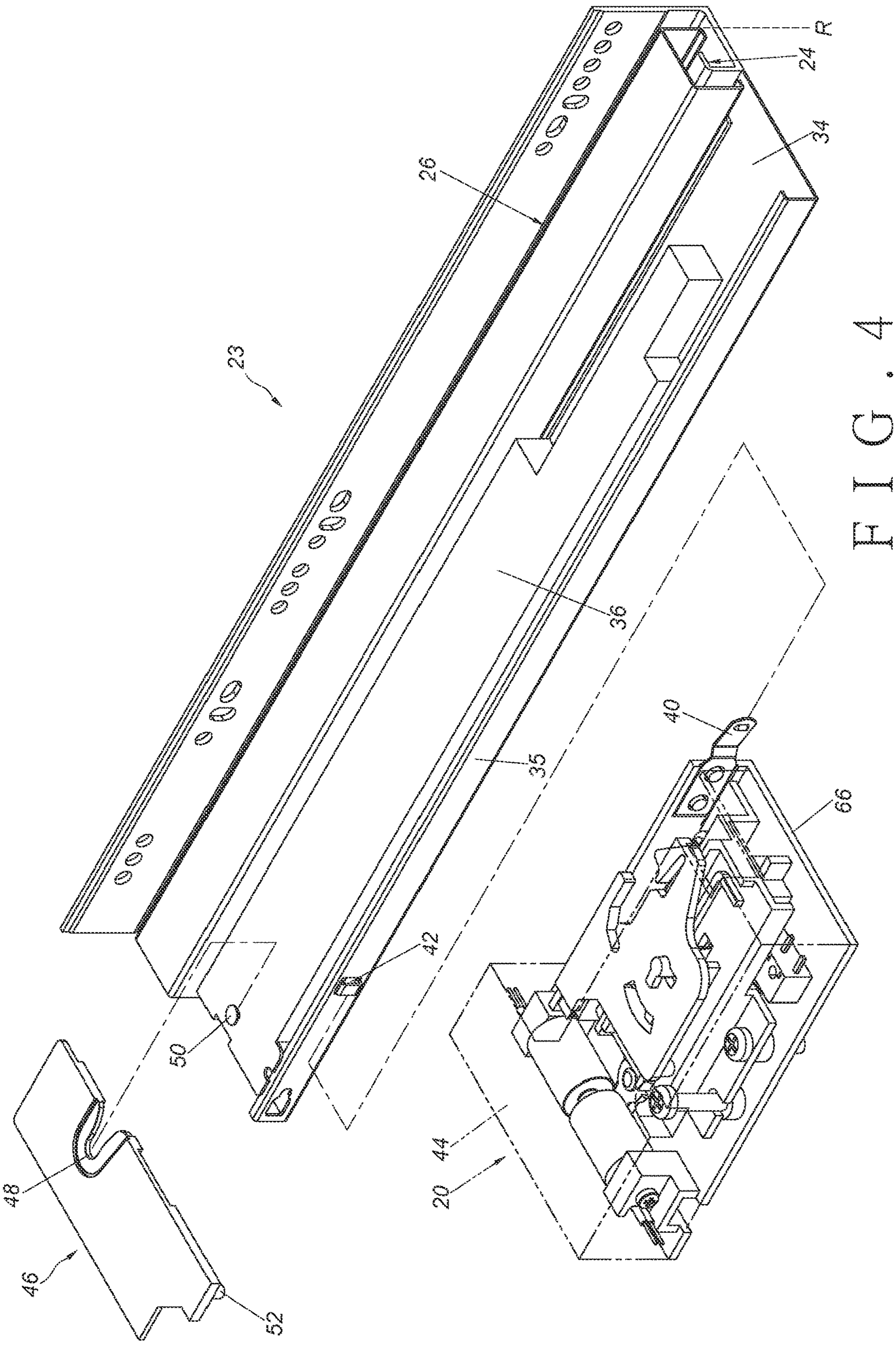
FIG. 4 is an exploded perspective view showing the locking device according to the embodiment of the present invention applied to the first object and the second object of the furniture, wherein the first and the second objects can be moved with respect to each other.

Referring to FIG. 3 and FIG. 4, the second object 26 can be at a retracted position R with respect to the first object 24. When at the retracted position R, the carrying portion 36 of the second object 26 substantially corresponds in position to the extension portion 34 of the first object 24 (see FIG. 3).

Preferably, the locking device 20 is detachably mounted on the first object 24. For example, the locking device 20 has a mounting feature 40, and a sidewall 35 of the extension portion 34 of the first object 24 has a mounting structure 42, wherein the mounting feature 40 and the mounting structure 42 are configured to be mounted on each other. Here, by way of example, one of the mounting feature 40 and the mounting structure 42 is a projecting portion, and the other of the mounting feature 40 and the mounting structure 42 is an insertion groove. The present invention, however, has no limitation on the configuration of the mounting feature 40 or the mounting structure 42.

Preferably, the locking device 20 has a housing 44 for covering, and thereby protecting, the majority of the components of the locking device 20.

Preferably, the furniture 22 further includes a fitting 46 detachably mounted on the carrying portion 36 of the second object 26. For example, the fitting 46 has a connecting feature 48, and the carrying portion 36 of the second object 26 has a connecting structure 50, wherein the connecting feature 48 and the connecting structure 50 are configured to be connected to each other. Here, by way of example, one of the connecting feature 48 and the connecting structure 50 is an engaging groove, and the other of the connecting feature 48 and the connecting structure 50 is a projection. The present invention, however, has no limitation on the configuration of the connecting feature 48 or the connecting structure 50.

Preferably, the fitting 46 includes an auxiliary portion 52 (see FIG. 4), and the auxiliary portion 52 is configured to work with the locking device 20. For example, the auxiliary portion 52 is, but is not limited to, a projection.

Figure 5:
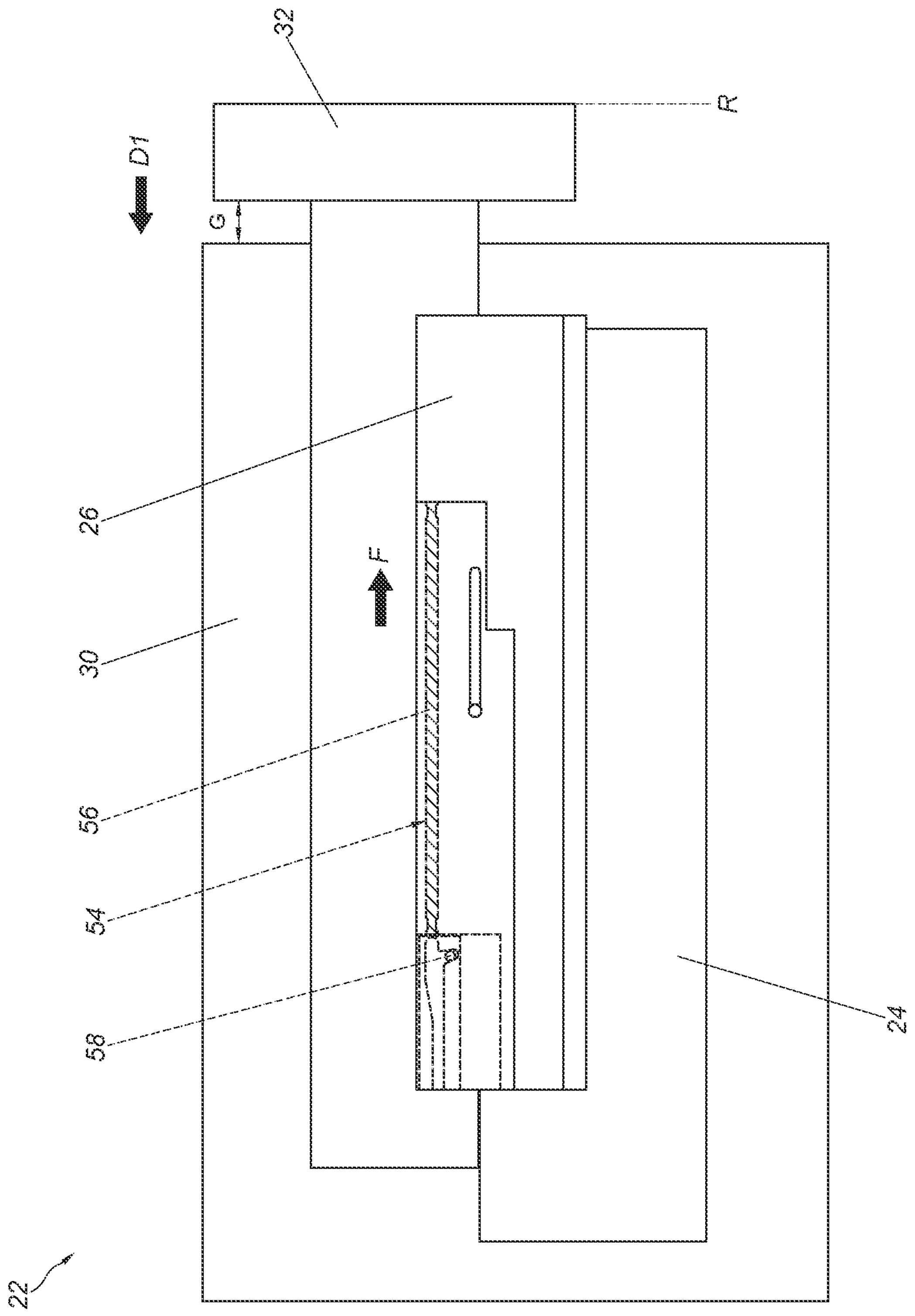
FIG. 5 shows that a drawer of the furniture according to the embodiment of the present invention is provided on the first object of a cabinet body via the second object and is at a retracted position.

Referring to FIG. 5, when the second object 26 has a push-to-open configuration in relation to the first object 24 and is at the retracted position R with respect to the first object 24, there is a gap G between the drawer 32 and the cabinet body 30. The gap G allows a user to push the drawer 32 and thereby displace the drawer 32 with respect to the cabinet body 30 so that the drawer 32 can be opened with respect to the cabinet body 30.

More specifically, the furniture 22 further includes a driving device 54 by which the second object 26, when at the retracted position R with respect to the first object 24, can be opened by being pushed in a retracting direction D1. The driving device 54 is provided on the second object 26, and the driving device 54 includes an elastic element 56 and a locking mechanism 58. The elastic element 56 provides an elastic force F, and the locking mechanism 58 can be operated so as to be in either one of an engaging state (see FIG. 5) and a disengaging state (see FIG. 6). When the locking mechanism 58 is in the engaging state, the elastic element 56 stores the elastic force F. When the locking mechanism 58 is in the disengaging state, the elastic element 56 releases the stored elastic force F. More specifically, the locking mechanism 58 is in the engaging state when the drawer 32 is at the retracted position R with respect to the cabinet body 30 and is still spaced apart from the cabinet body 30 by the gap G.

Figure 6:
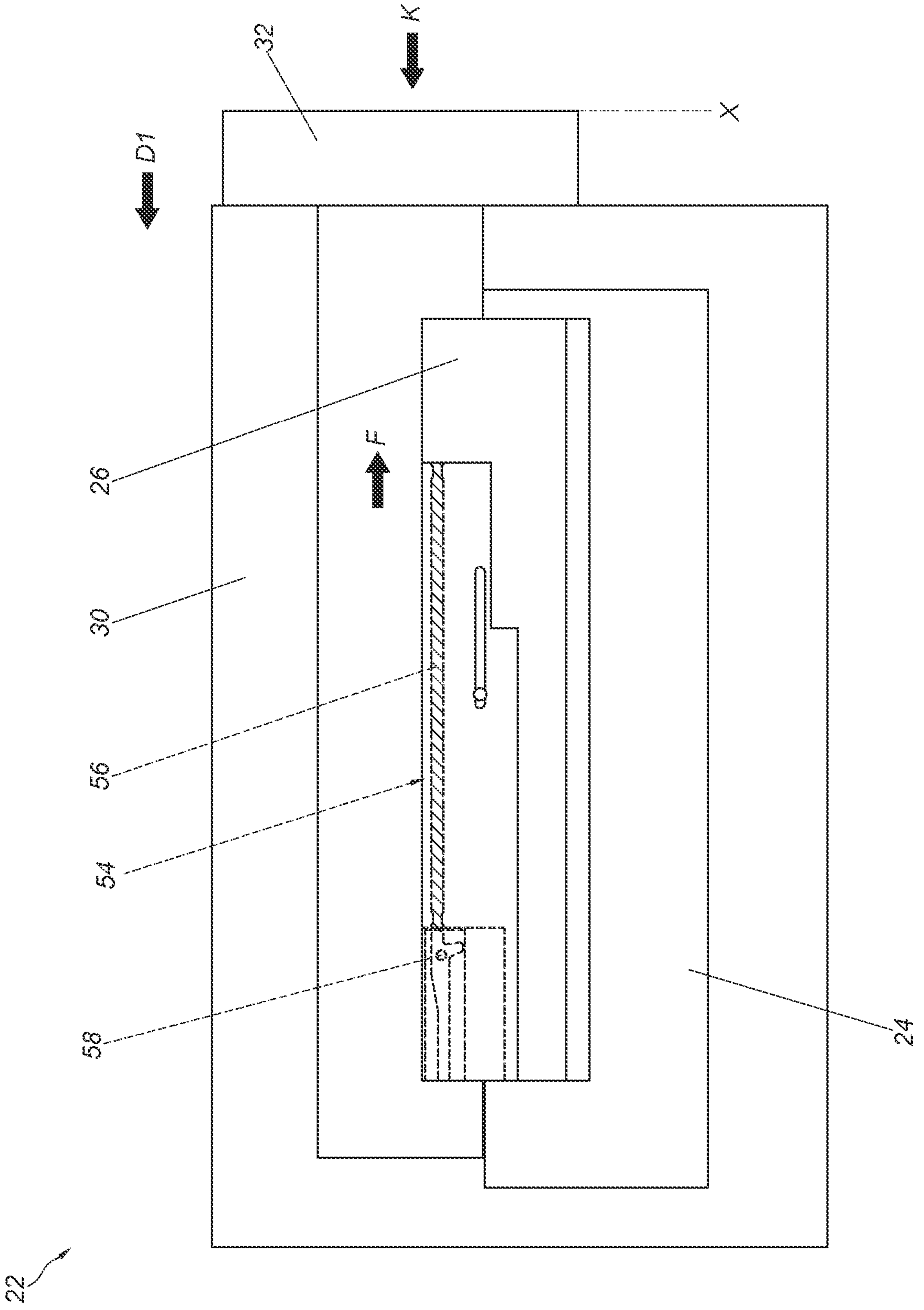
FIG. 6 show that the drawer of the furniture according to the embodiment of the present invention is pushed with respect to the cabinet body from the retracted position in a retracting direction.
Figure 7:
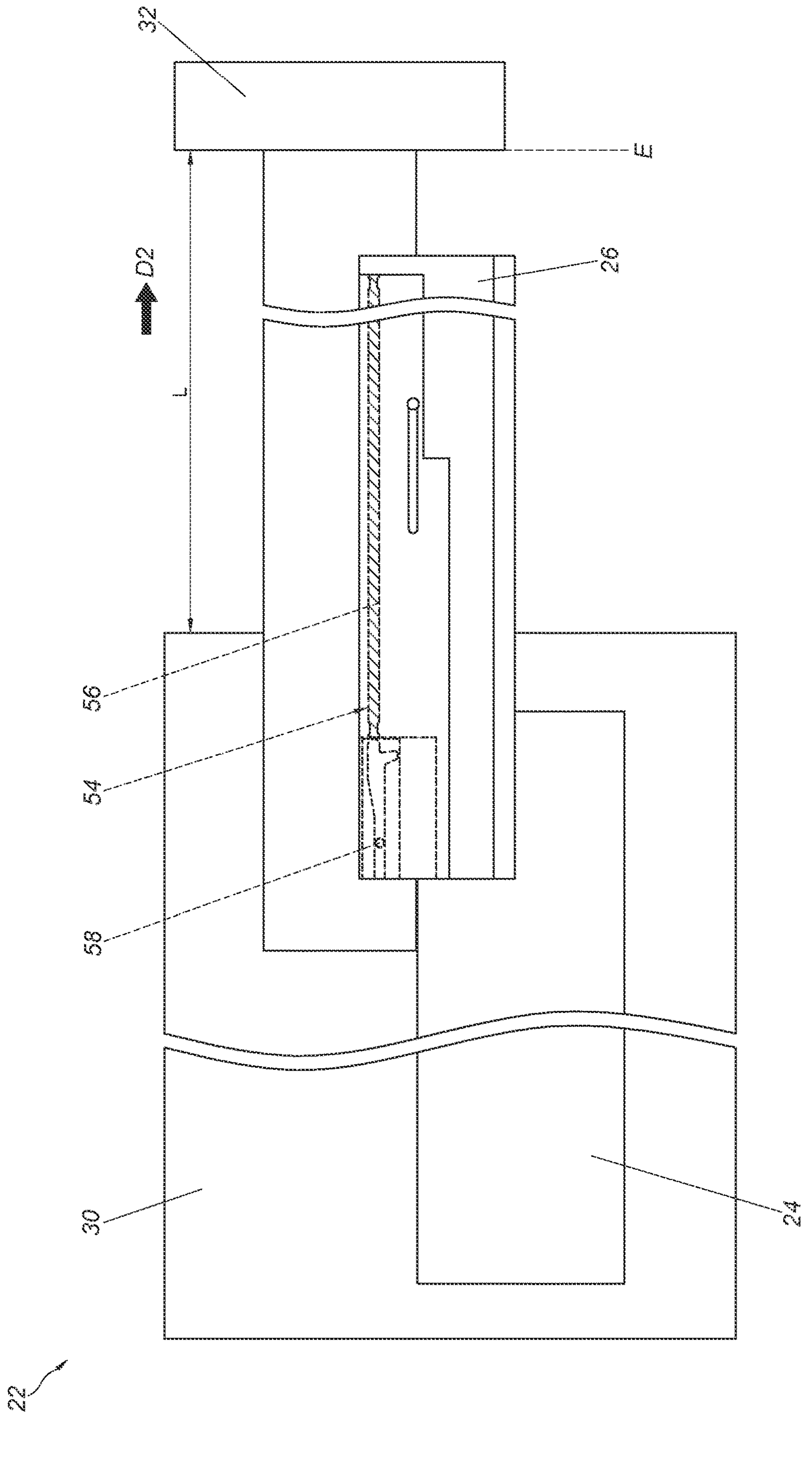
FIG. 7 shows that the drawer of the furniture according to the embodiment of the present invention is displaced in an opening direction after being pushed with respect to the cabinet body.

Referring to FIG. 6 and FIG. 7, when a user applies a pushing force K to the drawer 32 (or the second object 26) in the retracting direction D1 such that the drawer 32 (or the second object 26) reaches an over-pushed position X, the locking mechanism 58 of the driving device 54 is so operated that it is brought from the engaging state to the disengaging state. As soon as the application of the pushing force K is stopped, the elastic element 56 of the driving device 54 releases the elastic force F, and the drawer 32 is opened with respect to the cabinet body 30 by the elastic force F and is thus displaced from the over-pushed position X in an opening direction D2 until an extension distance L is formed from the drawer 32 to the cabinet body 30 (e.g., until the drawer 32 is at the extended position E with respect to the cabinet body 30). This is the so-called push-to-open function. The direction of the elastic force F of the driving device 54 is the opposite direction of the retracting direction D1.

Figure 8:
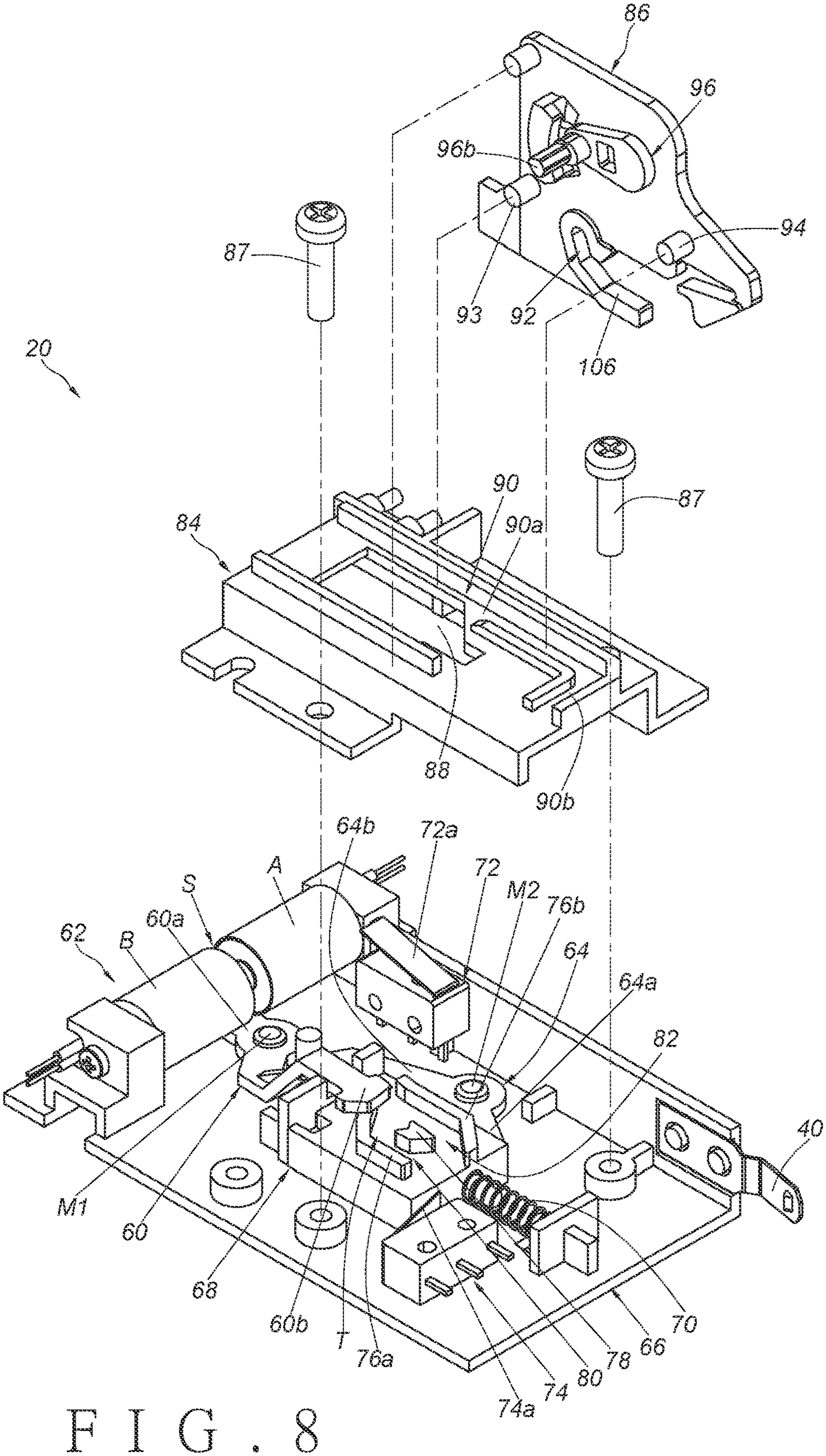
FIG. 8 is an exploded perspective view of the locking device according to the embodiment of the present invention.
Figure 9:
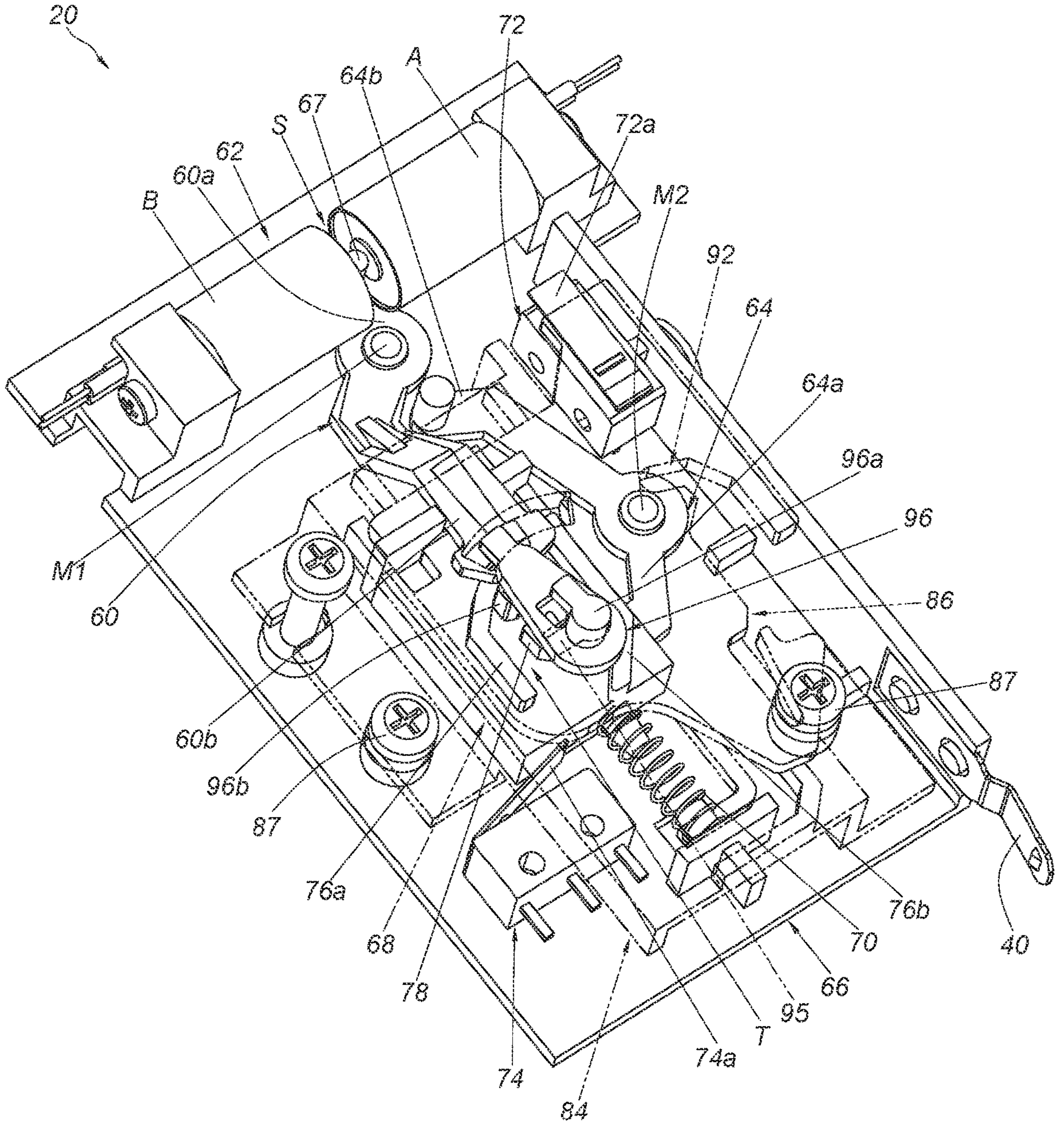
FIG. 9 is an assembled perspective view of the locking device according to the embodiment of the present invention.

Referring to FIG. 8 and FIG. 9, the locking device 20 includes a first element 60 and a control module 62. Here, the locking device 20 further includes a second element 64 by way of example.

Preferably, the locking device 20 further includes a base 66, and the control module 62, the first element 60, and the second element 64 are all provided on the base 66. The base 66 has the aforesaid mounting feature 40. The control module 62 includes at least one electromagnet. Here, the control module 62 includes a first electromagnet A and a second electromagnet B by way of example. The present invention, however, has no limitation on the number of such electromagnets. The first element 60 and the second element 64 are swing arms by way of example, and both the first element 60 and the second element 64 are movably mounted on the base 66. For example, the first element 60 and the second element 64 are pivotally connected to the base 66 by a first shaft M1 and a second shaft M2 respectively. The first element 60 has a first section 60*a* and a second section 60*b*. The first shaft M1 is located between the first section 60*a* and the second section 60*b* of the first element 60. The first section 60*a* is provided with a metal member 67 (see FIG. 9), and the metal member 67 is in a space S between the first electromagnet A and the second electromagnet B. The second element 64 has a first section 64*a* and a second section 64*b*. The second shaft M2 is located between the first section 64*a* and the second section 64*b* of the second element 64.

Preferably, the locking device 20 further includes a locking member 68, an elastic member 70, a first sensor 72, and a second sensor 74, all of which are provided on the base 66. The locking member 68 can be moved with respect to the base 66 in the longitudinal direction, and the locking member 68 includes at least one wall, such as a first extension wall 76*a* and a second extension wall 76*b*. Preferably, the locking member 68 further includes a middle portion 78 located between the first extension wall 76*a* and the second extension wall 76*b*. The first extension wall 76*a*, the second extension wall 76*b*, and the middle portion 78 jointly define a path T. The path T has an entrance 80 and an exit 82 (see FIG. 8). Preferably, the middle portion 78 is a projection with a generally heart-shaped contour. The present invention, however, has no limitation on the configuration of the middle portion 78. The elastic member 70 applies an elastic force to the locking member 68. The first sensor 72 and the second sensor 74 may be electronic switches, such as but not limited to proximity switches or microswitches. More specifically, the first sensor 72 has a first elastic sensing portion 72*a*, and the second sensor 74 has a second elastic sensing portion 74*a*.

Preferably, the locking device 20 further includes a middle member 84 and a slide block 86. The middle member 84 is provided on the base 66. For example, the middle member 84 is fixedly connected to the base 66 by at least one fixing member 87. The middle member 84 is sandwiched between the base 66 and the slide block 86. The middle member 84 has a bottom portion, a top portion, and a predetermined space 88 that brings the bottom portion and the top portion into communication with each other. The predetermined space 88 is, for example, an opening but is not necessarily so in practice. The bottom portion of the middle member 84 faces the locking member 68. The predetermined space 88 of the middle member 84 corresponds to the path T of the locking member 68. The top portion of the middle member 84 is configured to support the slide block 86. Preferably, the top portion of the middle member 84 has a track 90, and the slide block 86 can be moved along the track 90 of the middle member 84. Preferably, the track 90 includes a longitudinal path 90*a* and a bent path 90*b* in communication with the longitudinal path 90*a* (see FIG. 8). Preferably, the slide block 86 includes a retaining portion 92, a first leg 93, and a second leg 94. The retaining portion 92 is configured to work with the auxiliary portion 52 of the aforesaid fitting 46. The first leg 93 and the second leg 94 are configured to work with the track 90 of the middle member 84. Preferably, a locking hook 96 is movably mounted on the slide block 86, and the locking hook 96 includes a first portion 96*a* and a second portion 96*b*. The first portion 96*a* extends into a portion of a mounting space 95 of the slide block 86 (see FIG. 9), and the second portion 96*b* extends through the predetermined space 88 of the middle member 84 so as to work with the path T of the locking member 68 (see FIG. 8).

Figure 10:
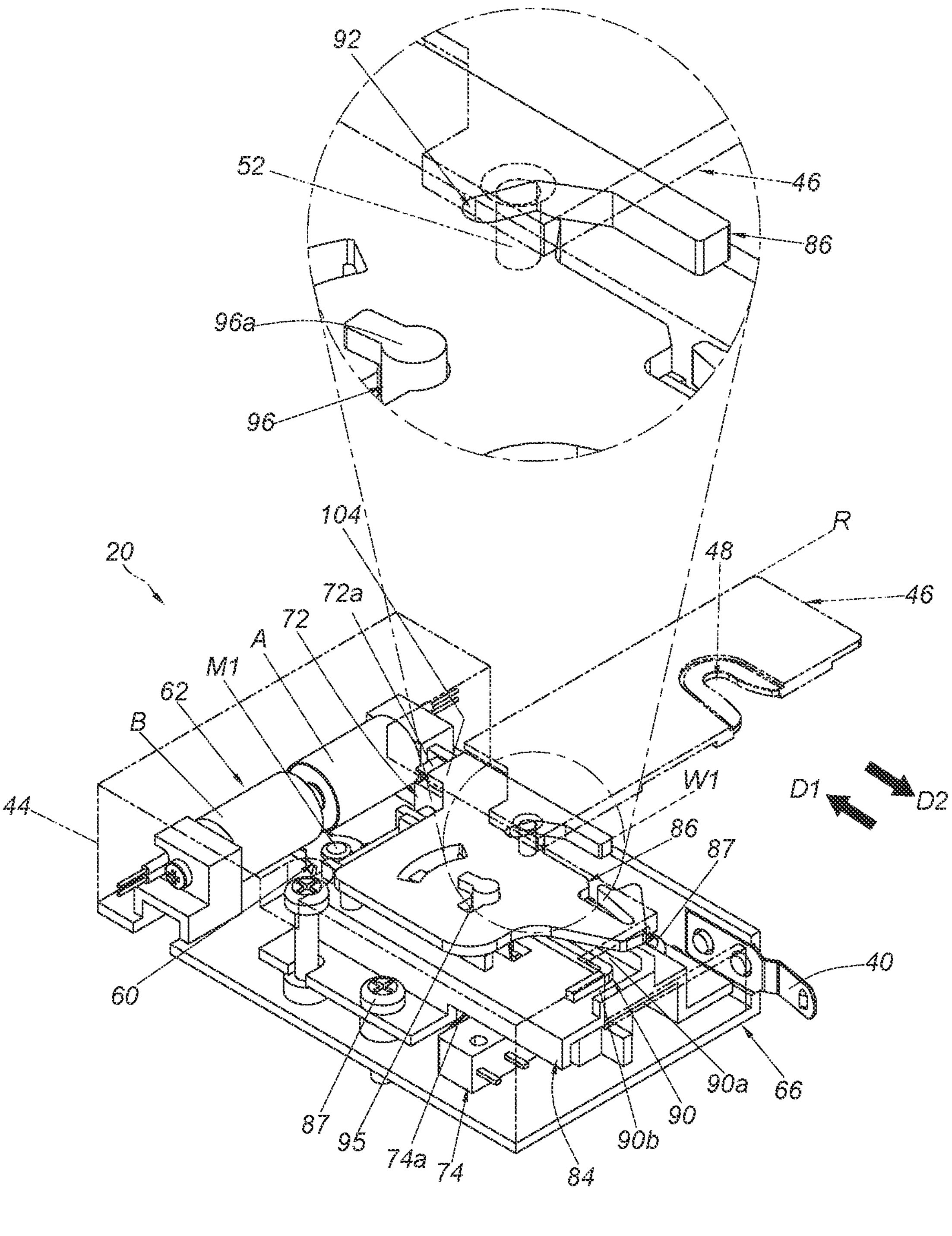
FIG. 10 is a perspective view showing how the locking device according to the embodiment of the present invention works with a fitting.
Figure 11:
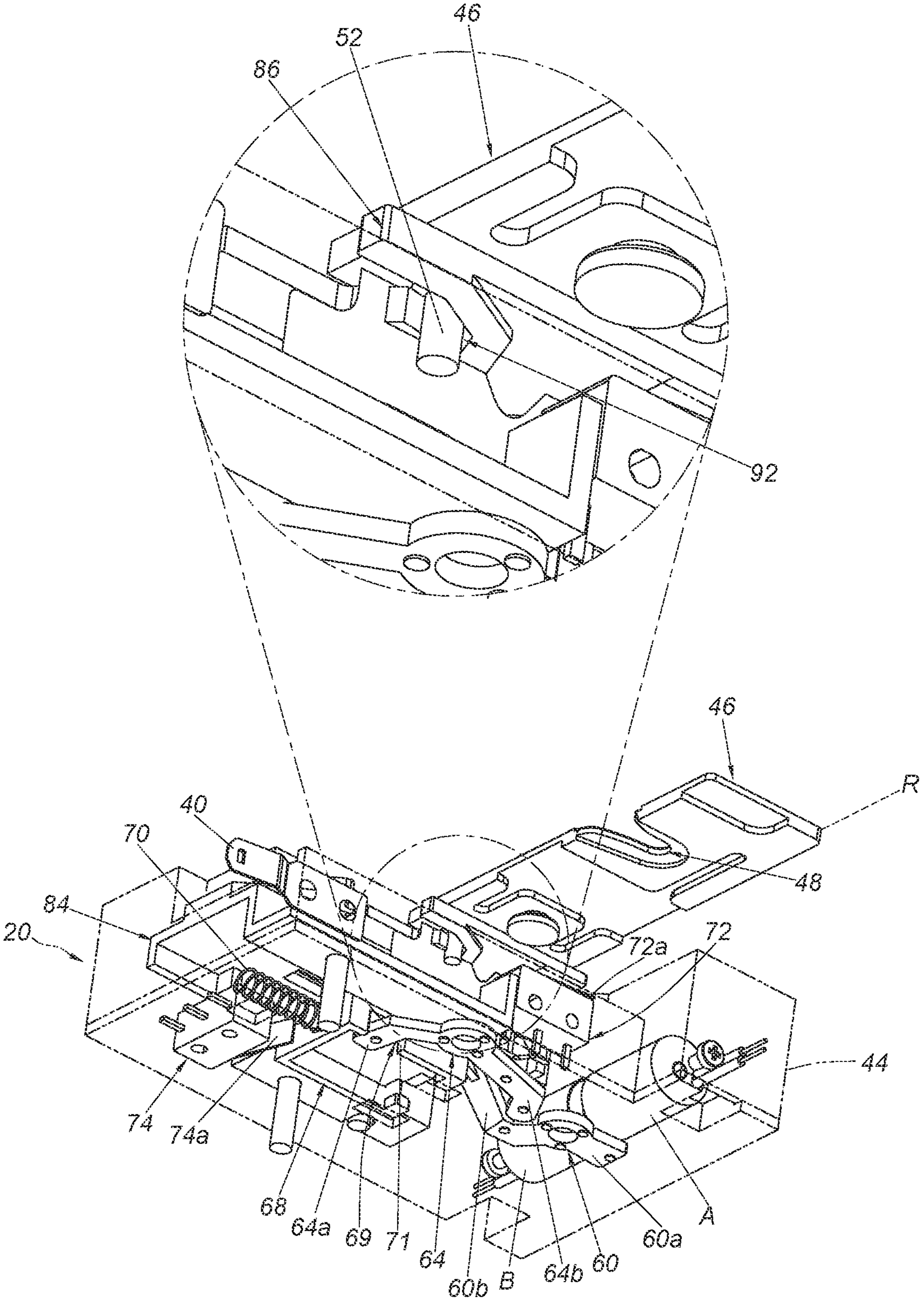
FIG. 11 is another perspective view showing how the locking device according to the embodiment of the present invention works with the fitting.

Referring to FIG. 10 and FIG. 11, as the locking device 20 is mounted on the first object 24 via the mounting feature 40, and the fitting 46 is mounted on the second object 26, the fitting 46 can be regarded as located at the retracted position R with respect to the locking device 20 when the second object 26 (the drawer 32) is at the retracted position R with respect to the first object 24 (the cabinet body 30). When the fitting 46 is at the retracted position R with respect to the locking device 20, the auxiliary portion 52 of the fitting 46 is caught by the retaining portion 92 of the slide block 86.

Figure 12:
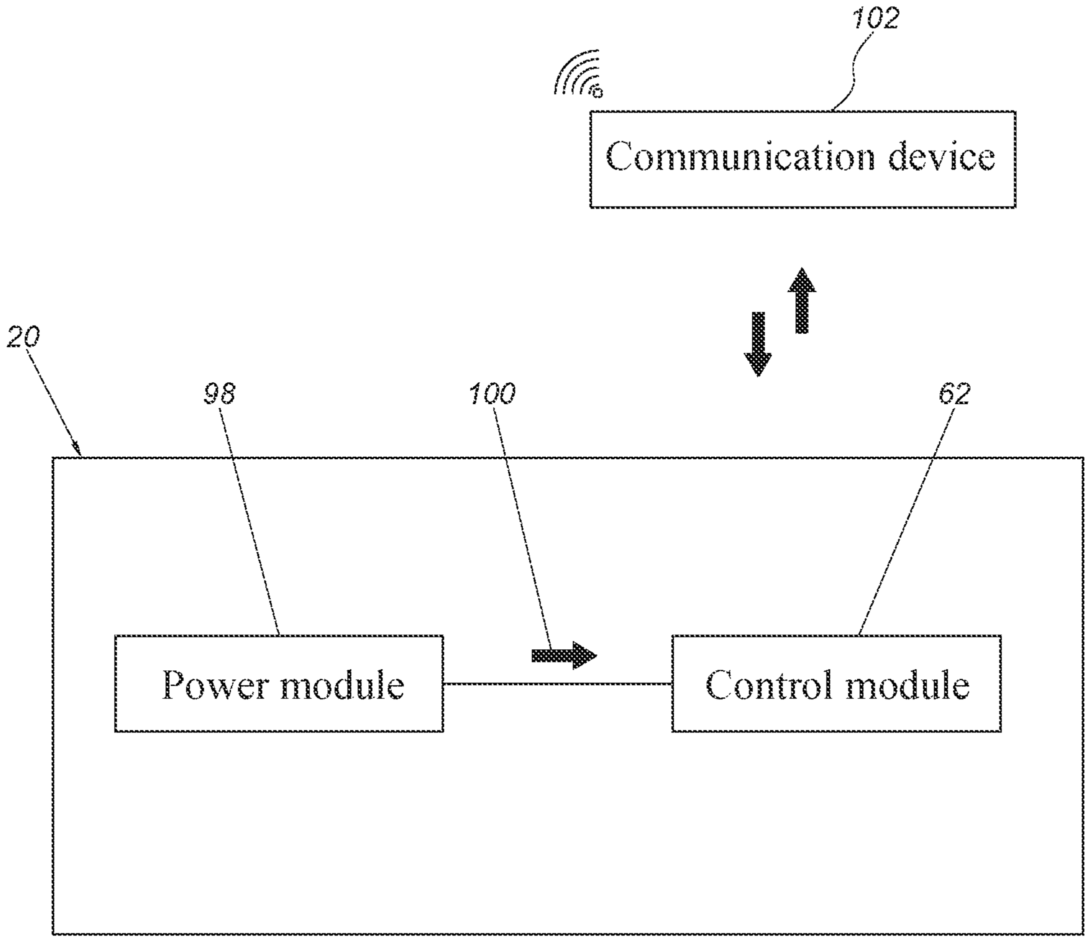
FIG. 12 is a block diagram showing how the locking device according to the embodiment of the present invention and a communication device form a communication connection.

Referring to FIG. 12, the locking device 20 further includes a power module 98. The power module 98 is configured to supply electrical energy 100 to the control module 62. A communication device 102 can form a communication connection with the locking device 20 in a wireless or wired manner in order to control the control module 62. The communication device 102 is, for example but not limited to, a mobile phone, tablet computer, or smartwatch.

Figure 13:
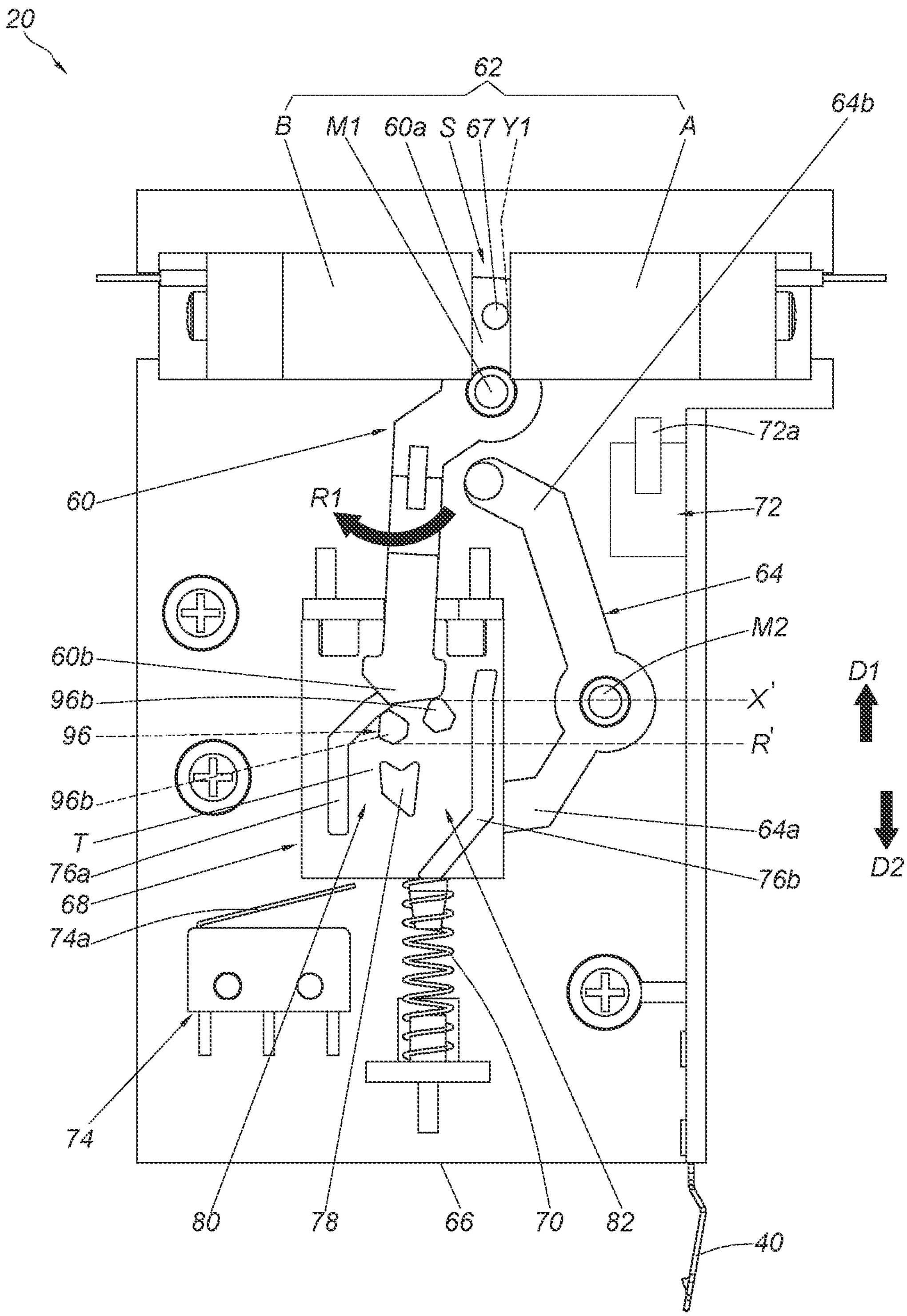
FIG. 13 shows a first action of the locking device according to the embodiment of the present invention.
Figure 14:
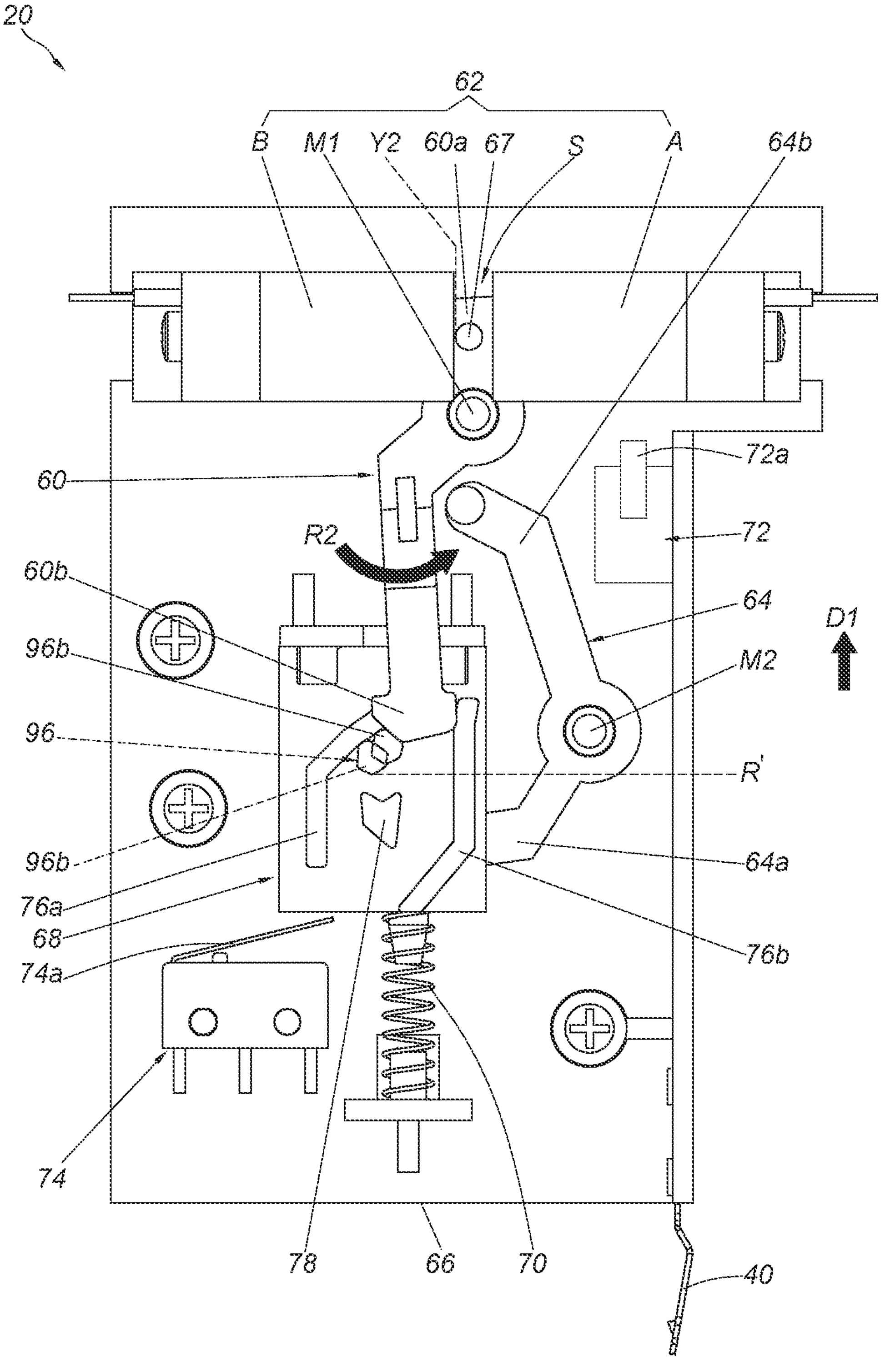
FIG. 14 shows a second action of the locking device according to the embodiment of the present invention.

Referring to FIG. 13 and FIG. 14, the first element 60 can be moved between an unlocking state Y1 (see FIG. 13) and a locking state Y2 (see FIG. 14)

Preferably, the control module 62 is configured to drive the first element 60 into either one of the unlocking state Y1 and the locking state Y2.

Referring to FIG. 13, it is preferable that as soon as the locking device 20 receives an unlocking signal from the communication device 102, the first electromagnet A is supplied with electricity in order for the control module 62 to drive the first element 60 into the unlocking state Y1.

More specifically, the first electromagnet A will attract the metal member 67 on the first section 60*a* of the first element 60 such that the first element 60 is pivoted through an angle in a first predetermined direction R1 about the first shaft M1, and in consequence, the path T of the locking member 68 is not blocked by the second section 60*b* of the first element 60.

Referring to FIG. 14, it is preferable that as soon as the locking device 20 receives a locking signal from the communication device 102, the second electromagnet B is supplied with electricity in order for the control module 62 to drive the first element 60 into the locking state Y2. More specifically, the second electromagnet B will attract the metal member 67 on the first section 60*a* of the first element 60 such that the first element 60 is pivoted through an angle in a second predetermined direction R2 about the first shaft M1, and in consequence, the path T of the locking member 68 is blocked by the second section 60*b* of the first element 60. The second predetermined direction R2 is the opposite direction of the first predetermined direction R1.

Referring to FIG. 10 and FIG. 13, when the first element 60 is in the unlocking state Y1 (see FIG. 13), the second object 26 (represented in FIG. 10 by the fitting 46, which is mounted on the second object 26) can be opened by being pushed with respect to the first object 24 (represented in FIG. 10 by the locking device 20, which is mounted on the first object 24) from the retracted position R in the retracting direction D1.

More specifically, when the first element 60 is in the unlocking state Y1, the path T of the locking member 68 is not blocked by the second section 60*b* of the first element 60 (see FIG. 13). Furthermore, when the fitting 46 is at the retracted position R with respect to the locking device 20, the auxiliary portion 52 of the fitting 46 is caught by the retaining portion 92 of the slide block 86 so that by way of the fitting 46, the second object 26 (the drawer 32) can move the slide block 86 with respect to the first object 24 (the cabinet body 30) from the retracted position R in the retracting direction D1. During the process, the second portion 96*b* of the locking hook 96 will be moved from a corresponding retracted position R' along the path T of the locking member 68 (see FIG. 13) now that the path T is not blocked by the second section 60*b* of the first element 60. Once the second object 26 (the drawer 32) reaches the over-pushed position X after being displaced in the retracting direction D1, the second portion 96*b* of the locking hook 96 on the slide block 86 is at a corresponding over-pushed position X' in the path T, and the push-to-open function is thus activated (see FIG. 6). As a result, the second object 26 (the drawer 32) is opened, or displaced with respect to the first object 24 (the cabinet body 30) from the over-pushed position X in the opening direction D2. During the process, the second portion 96*b* of the locking hook 96 on the slide block 86 is moved along the path T and eventually exits the path T through the exit 82 of the path T. It can be known from the above that when the first element 60 is in the unlocking state Y1 and the second object 26 (the drawer 32) is at the retracted position R, a user can open the second object 26 (the drawer 32) by pushing it.

Referring to FIG. 10 and FIG. 14, when the first element 60 is in the locking state Y2 (see FIG. 14), the second object 26 cannot be opened by being pushed with respect to the first object 24 from the retracted position R in the retracting direction D1.

More specifically, when the first element 60 is in the locking state Y2, the second section 60*b* of the first element 60 blocks the path T of the locking member 68 and thereby obstructs the second portion 96*b* of the locking hook 96, making it impossible to displace the second object 26 (the drawer 32) with respect to the first object 24 (the cabinet body 30) in the retracting direction D1 to the over-pushed position X (i.e., making it impossible to move the second portion 96*b* of the locking hook 96 on the slide block 86 from the corresponding retracted position R' to the corresponding over-pushed position X' in the path T). The push-to-open function, therefore, cannot be activated. It can be known from the above that when the first element 60 is in the locking state Y2 and the second object 26 (the drawer 32) is at the retracted position R, a user cannot open the second object 26 (the drawer 32) by pushing it.

Preferably, the first sensor 72 is configured to sense whether the second object 26 (represented in FIG. 10 by the fitting 46, which is mounted on the second object 26) is at the retracted position R, so that the first element 60 can be controlled to enter the locking state Y2 (see FIG. 14) accordingly. For example, when the second object 26 (the fitting 46) is at the retracted position R with respect to the first object 24 (the locking device 20), the first elastic sensing portion 72*a* of the first sensor 72 is held down by a predetermined portion 104 of the slide block 86, and once the first sensor 72 senses through the first elastic sensing portion 72*a* that the second object 26 (the fitting 46) is at the retracted position R (see FIG. 10), the second electromagnet B is supplied with electricity to bring the first element 60 into the locking state Y2 (see FIG. 14).

Figure 15:
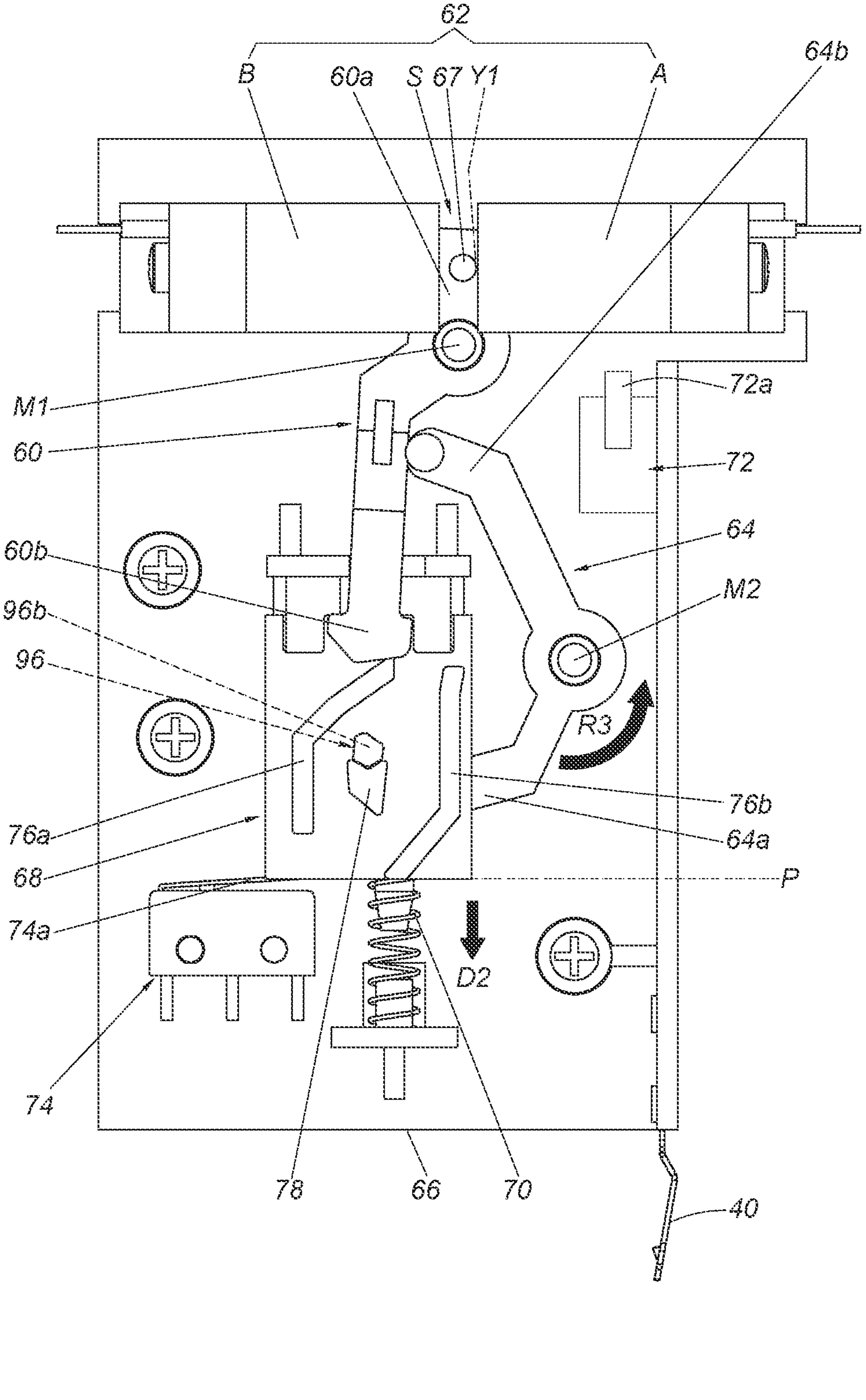
FIG. 15 shows a third action of the locking device according to the embodiment of the present invention.

Referring to FIG. 14 and FIG. 15, the second element 64 is configured to drive the first element 60 and thereby move the first element 60 from the locking state Y2 (see FIG. 14) to the unlocking state Y1 (see FIG. 15) in response to the second object 26 (the drawer 32) being displaced with respect to the first object 24 (the cabinet body 30) from the retracted position R (see FIG. 10) to a predetermined position P (see FIG. 15) in the opening direction D2.

For example, when the first element 60 is in the locking state Y2 (see FIG. 14) but the electrical energy 100 is no longer supplied (e.g., when the power module 98 is out of electricity or accidentally stops supplying the electrical energy 100 to the control module 62) or a related electronic component is damaged, the second element 64 can drive the first element 60 (see FIG. 15) in response to the second object 26 (the drawer 32) being displaced with respect to the first object 24 (the cabinet body 30) from the retracted position R to the predetermined position P in the opening direction D2, such that the first element 60 is moved from the locking state Y2 (see FIG. 14) to the unlocking state Y1 (see FIG. 15). In other words, a user only has to displace the second object 26 (the drawer 32) with respect to the first object 24 (the cabinet body 30) for a predetermined distance from the retracted position R to the predetermined position P in the opening direction D2, and the second element 64 will drive the first element 60 and thereby move the first element 60 from the locking state Y2 to the unlocking state Y1 so that the drawer 32 can be opened by being pushed. Unlike the prior art, therefore, the locking device 20 in this embodiment does not require an additional manual unlocking mechanism.

Preferably, in the course in which the second object 26 is displaced with respect to the first object 24 from the retracted position R to the predetermined position P in the opening direction D2, the locking member 68 can drive the second element 64 to move the first element 60 from the locking state Y2 (see FIG. 14) to the unlocking state Y1 (see FIG. 15). For example, in the course in which the second object 26 is displaced with respect to the first object 24 from the retracted position R to the predetermined position P in the opening direction D2, the fitting 46 drives the slide block 86 in the opening direction D2 in order to press the second portion 96*b* of the locking hook 96 on the slide block 86 against the middle portion 78 of the locking member 68 (see FIG. 15) and thereby displace the locking member 68 longitudinally with respect to the base 66 from an initial position (see FIG. 14) to the predetermined position P (see FIG. 15) in the opening direction D2. During the process, the locking member 68 will drive the first section 64*a* of the second element 64 such that the second element 64 is pivoted through an angle in a third predetermined direction R3 about the second shaft M2, with the second section 64*b* of the second element 64 pushing the first element 60 from the locking state Y2 to the unlocking state Y1 (see FIG. 15).

Preferably, the first section 64*a* of the second element 64 extends into a portion of a receiving space 69 of the locking member 68 (see FIG. 11) so that the locking member 68 can drive the first section 64*a* of the second element 64 via an inner wall 71 of the receiving space 69 and thereby pivot the second element 64 in the third predetermined direction R3.

Preferably, the second sensor 74 is configured to sense whether the second object 26 is at the predetermined position P (see FIG. 15, in which the locking member 68 is at the predetermined position P and represents the second object 26 at the predetermined position P). For example, when the locking member 68 is at the predetermined position P, the second elastic sensing portion 74*a* of the second sensor 74 is held down by the locking member 68, so the locking device 20 can detect through the second elastic sensing portion 74*a* that the second object 26 is at the predetermined position P. If the electrical energy 100 is still available, and the second object 26 (the drawer 32) is displaced with respect to the first object 24 (the cabinet body 30) for a predetermined distance from the retracted position R to the predetermined position P in the opening direction D2 by a person, the second electromagnet B will be supplied with electricity as soon as the person releases the second object 26 (the drawer 32) from the predetermined position P, or more particularly according to the corresponding signal detected by the second elastic sensing portion 74*a* of the second sensor 74, thereby bringing the first element 60 back into the locking state Y2 (see FIG. 14).

Preferably, when the locking member 68 is at the predetermined position P (see FIG. 15), the elastic member 70 is in a state in which it stores an elastic restoring force. The elastic restoring force is intended to return the locking member 68 to the initial position (see FIG. 14) so that the second elastic sensing portion 74*a* of the second sensor 74 is no longer held down by the locking member 68.

Figure 16:
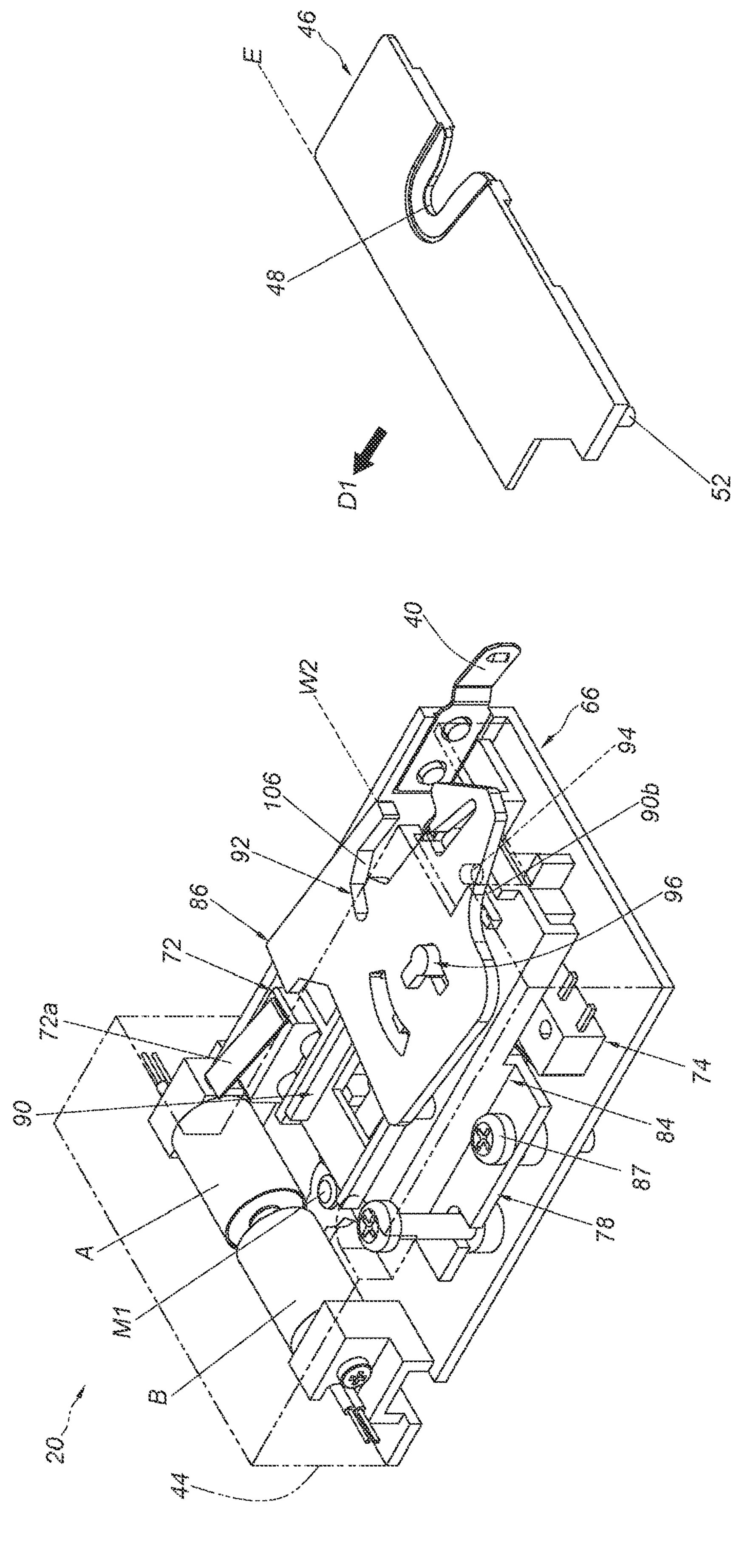
FIG. 16 is yet another perspective view showing how the locking device according to the embodiment of the present invention works with the fitting.

Referring to FIG. 16, when the second object 26 (the drawer 32) is at the extended position E with respect to the first object 24 (the cabinet body 30) (represented in FIG. 16 by the fitting 46 being at the extended position E with respect to the locking device 20), the slide block 86 is at a pivoted position W2 with respect to the middle member 84, and the second leg 94 of the slide block 86 has left the longitudinal path 90*a* of the track 90 of the middle member 84 and entered the bent path 90*b* of the track 90. While the second object 26 (the drawer 32) is being displaced with respect to the first object 24 (the cabinet body 30) from the extended position E in the retracting direction D1 (represented in FIG. 16 by the fitting 46 being displaced with respect to the locking device 20 from the extended position E in the retracting direction DO, the auxiliary portion 52 of the fitting 46 touches a guiding portion 106 (e.g., an inclined or curved surface) of the slide block 86 and thereby rotates the slide block 86 from the pivoted position W2 back to an initial predetermined position W1. During the process, the second portion 96*b* of the locking hook 96 enters the path T of the locking member 68 through the entrance 80 (see FIG. 13) and moves along the path T until the fitting 46 returns to the retracted position R with respect to the locking device 20 (see FIG. 10).

Figure 17:
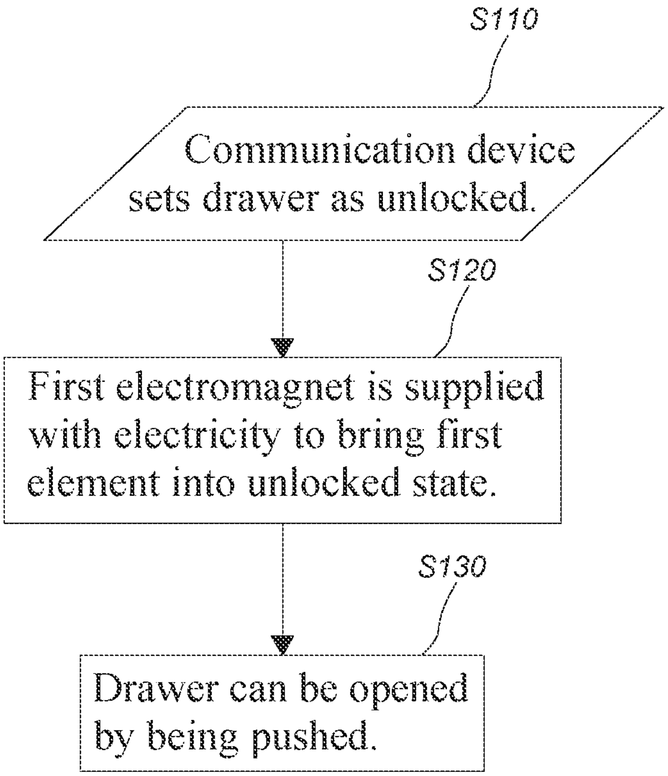
FIG. 17 shows a first operation process of the locking device according to the embodiment of the present invention, with the locking device applied to the furniture.

Referring to FIG. 17, a first operation process of the locking device 20 according to the foregoing embodiment of the present invention includes the following steps:

Step S110: The communication device 102 sets the drawer 32 as unlocked.

In step S110, a user uses the communication device 102, or more particularly an application program (APP) installed in the communication device 102, to send out an unlocking signal.

Step S120: The first electromagnet A is supplied with electricity to bring the first element 60 into the unlocking state Y1.

In step S120, the first electromagnet A is supplied with electricity as soon as the locking device 20 receives the unlocking signal from the communication device 102, and the first element 60 is driven into the unlocking state Y1 as a result.

Step S130: The drawer 32 can be opened by being pushed.

In step S130, the drawer 32 (the second object 26) is allowed to be opened by being pushed with respect to the cabinet body 30 (the first object 24) from the retracted position R in the retracting direction D1 while the first element 60 is driven into the unlocking state Y1.

Figure 18:
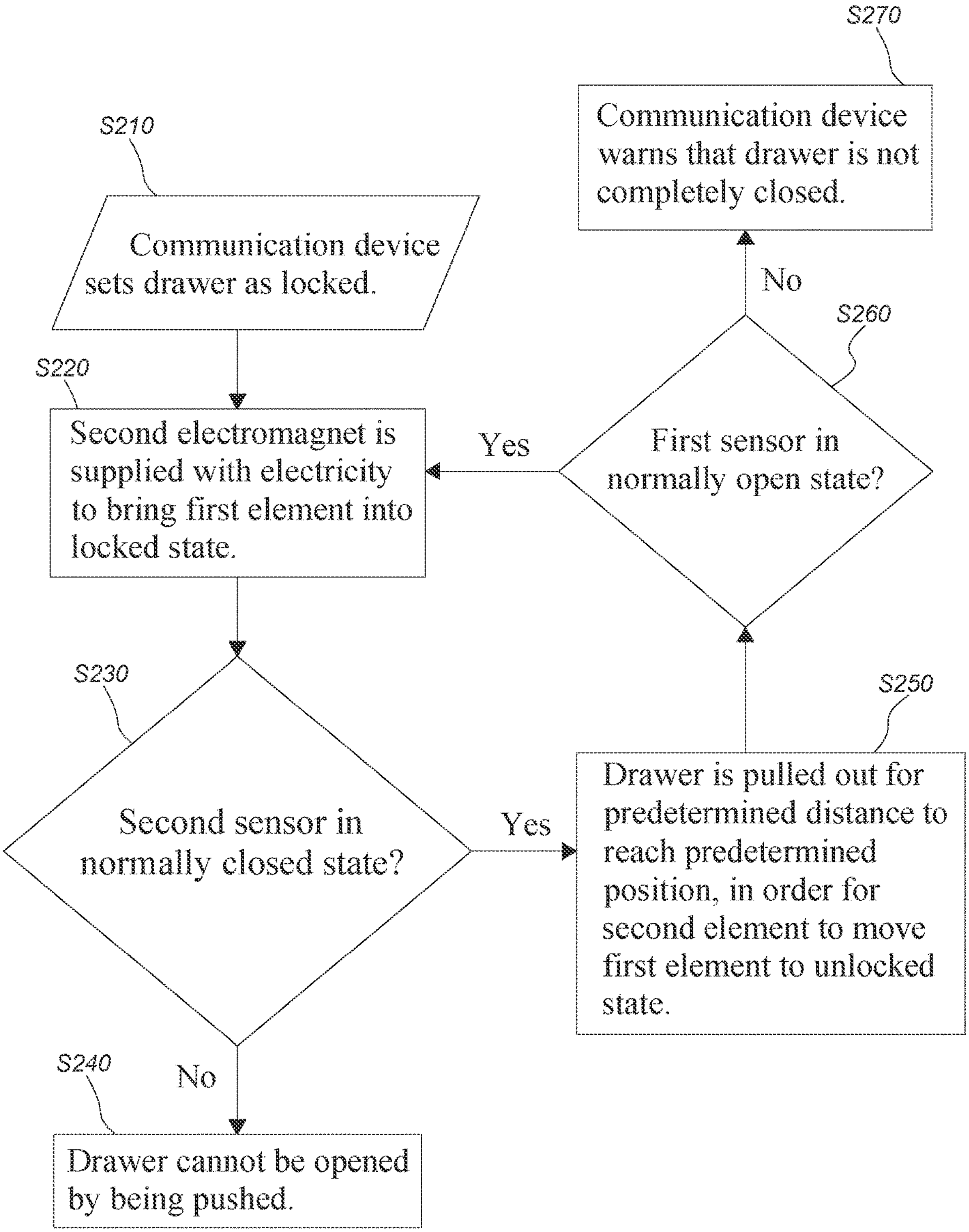
FIG. 18 shows a second operation process of the locking device according to the embodiment of the present invention, with the locking device applied to the furniture.

Referring to FIG. 18, a second operation process of the locking device 20 according to the foregoing embodiment of the present invention includes the following steps:

Step S210: The communication device 102 sets the drawer 32 as locked.

In step S210, a user uses the application program in the communication device 102 to send out a locking signal.

Step S220: The second electromagnet B is supplied with electricity to bring the first element 60 into the locking state Y2.

In step S220, the second electromagnet B is supplied with electricity as soon as the locking device 20 receives the locking signal from the communication device 102, and the first element 60 is driven into the locking state Y2 as a result.

Step S230: It is detected whether the second sensor 74 is in a normally closed (NC) state.

In step S230, the locking device 20 detects whether the second sensor 74 is in a normally closed state. Step S240 will be performed if the second sensor 74 is not in the normally closed state, and step S250 if the second sensor 74 is in the normally closed state. In step S240, the drawer 32 cannot be opened by being pushed. In step S250, the drawer 32 is pulled out for a certain distance to the predetermined position P, in order for the second element 64 to move the first element 60 to the unlocking state Y1.

Step S260: It is detected whether the first sensor 72 is in a normally open (NO) state.

In step S260, the locking device 20 detects whether the first sensor 72 is in a normally open state. For example, the locking device 20 detects whether the first elastic sensing portion 72*a* of the first sensor 72 is held down, so as to determine whether the second object 26 (or the drawer 32) is at the retracted position R with respect to the first object 24 (or the cabinet body 30) (see FIG. 10). Step S270 will be performed if the first elastic sensing portion 72*a* is not held down, and step S220 if the first elastic sensing portion 72*a* is held down. In step S270, the communication device 102 warns that the drawer 32 is not completely closed. For example, the communication device 102 in step S270 makes a sound and/or sends out an electronic message by way of the application program in order to inform the user that the drawer 32 is not exactly at the retracted position R. In step S220, as stated above, the second electromagnet B is supplied with electricity to bring the first element 60 into the locking state Y2. Step S220 being performed indicates that the first elastic sensing portion 72*a* of the first sensor 72 is held down, i.e., the second object 26 (or the drawer 32) is at the retracted position R with respect to the first object 24 (or the cabinet body 30) (see FIG. 10, in which the first elastic sensing portion 72*a* of the first sensor 72 is held down by the predetermined portion 104 of the slide block 86), and the second electromagnet B is supplied with electricity in step S220 in order to drive the first element 60 into the locking state Y2, in which the second object 26 (or the drawer 32) cannot be opened by being pushed.

It can be known from the above that the locking device 20 according to the foregoing embodiment of the present invention preferably has the following features:

1. The first element 60 of the locking device 20 can be electrically controlled so as to enter the locking state Y2 or the unlocking state Y1. When the first element 60 is in the locking state Y2, the second object 26 cannot be opened by being pushed with respect to the first object 24 from the retracted position R in the retracting direction D1. When the first element 60 is in the unlocking state Y1, the second object 26 can be opened by being pushed with respect to the first object 24 from the retracted position R in the retracting direction D1.
2. The second element 64 can drive the first element 60 and thereby move the first element 60 from the locking state Y2 to the unlocking state Y1. This operation mechanism is useful in cases where the first element 60 is in the locking state Y2 but the power module 98 stops supplying the electrical energy 100 to the control module 62 or a related electronic component is damaged. More specifically, a user only has to operate the second object 26 (the drawer 32) and thereby displace the second object 26 (the drawer 32) with respect to the first object 24 (the cabinet body 30) from the retracted position R to the predetermined position P in the opening direction D2, and the second element 64 will drive and thereby move the first element 60 from the locking state Y2 to the unlocking state Y1. The locking device 20 in the foregoing embodiment, therefore, does not require an additional manual unlocking mechanism as does its prior art counterparts.

While the present invention has been disclosed through the preferred embodiment described above, the embodiment is not intended to be restrictive of the scope of the invention. The scope of the patent protection sought by the applicant is defined by the appended claims.

The invention claimed is:

1. A locking device comprising:

a first object;

a second object, said first and said second object being movable each to the other;

a first element mounted to a locking device base member, said first element movable between a locking state and an unlocking state;

a second element mounted to said locking base member wherein the second element drives the first element and thereby moves the first element from the locking state to the unlocking state responsive to displacement of the second object with respect to the first object from a retracted position to a predetermined position in an opening direction;

a control module for driving the first element into either one of the locking state and the unlocking state; and a power module for supplying electrical energy to the control module, wherein when the first element is in the locking state, but the electrical energy is no longer supplied, the second element drives the first element and thereby moves the first element from the locking state to the unlocking state responsive to displacement of the second object with respect to the first object from the retracted position to the predetermined position in the opening direction.

2. The locking device of claim 1, further comprising a base, wherein the control module, the first element, and the second element are provided on the base.

3. The locking device of claim 2, further comprising a locking member, wherein while the second object is being displaced with respect to the first object from the retracted position to the predetermined position in the opening direction, the locking member drives the second element to move the first element from the locking state to the unlocking state.

4. The locking device of claim 3, further comprising an elastic member for applying an elastic force to the locking member.

5. The locking device of claim 3, further comprising a locking hook, wherein the locking hook has a second portion configured to work with a path of the locking member, the locking state is a state in which the path of the locking member is blocked by a second section of the first element such that the second portion of the locking hook is obstructed in the path by the second section of the first element, and the unlocking state is a state in which the path of the locking member is not blocked by the second section of the first element such that the second portion of the locking hook is not obstructed in the path, the second object therefore being allowed to be displaced with respect to the first object to an extended position in the opening direction, thereby causing the second portion of the locking hook to exit the path.

6. The locking device of claim 5, further comprising a middle member and a slide block, wherein the middle member is sandwiched between the base and the slide block, the locking hook is movably mounted on the slide block, the slide block is movable along a track of the middle member, the slide block is at a pivoted position with respect to the middle member when the second object is at the extended position with respect to the first object, and when the second object is displaced with respect to the first object from the extended position back to the retracted position in a retracting direction, the second portion of the locking hook enters the path of the locking member and moves the slide block from the pivoted position back to an initial predetermined position.

7. The locking device of claim 1, further comprising a first sensor for sensing whether the second object is at the retracted position and a second sensor for sensing whether the second object is at the predetermined position.

8. A locking device mounted in a piece of furniture, the locking device comprising:

a first object adapted to be coupled to said piece of furniture;

a second object, said first and second objects being moveable each to the other;

a first element mounted to a locking device base member;

a second element mounted to said locking base member and moveable in cooperation with said first element;

a control module for driving the first element into either one of a locking state and an unlocking state; and, a power module configured to supply electrical energy to the control module;

herein when the first element is in the locking state but the electrical energy is no longer supplied, the second element drives the first element and thereby moves the first element from the locking state to the unlocking state responsive to displacement of the second object with respect to the first object from a retracted position to a predetermined position in an opening direction, wherein when the first element is in the locking state, the second object is not allowed to be opened by being pushed with respect to the first object from the retracted position in a retracting direction, and wherein when the first element is in the unlocking state, the second object is allowed to be opened by being pushed with respect to the first object from the retracted position in the retracting direction.

9. The locking device of claim 8, further comprising a base, wherein the control module, the first element, and the second element are provided on the base.

10. The locking device of claim 9, wherein the locking device is detachably mounted on the first object.

11. The locking device of claim 9, further comprising a locking member, wherein while the second object is being displaced with respect to the first object from the retracted position to the predetermined position in the opening direction, the locking member drives the second element to move the first element from the locking state to the unlocking state.

12. The locking device of claim 11, further comprising an elastic member for applying an elastic force to the locking member.

13. The locking device of claim 8, wherein the first object is a first rail, and the second object is a second rail; wherein the first object is provided on a cabinet body, and the second object is configured to carry a drawer.

14. The locking device of claim 8, wherein the control module includes a first electromagnet, and the control module moves the first element to the unlocking state via the first electromagnet when receiving an unlocking signal from a communication device.

15. The locking device of claim 8, wherein the control module includes a second electromagnet, and the control module moves the first element to the locking state via the second electromagnet when receiving a locking signal from a communication device.

16. A locking device, comprising:

a locking device base member;

a first element movably mounted on the locking device base member;

a second element movably mounted on the locking device base member;

a control module for receiving signals from a communication device which transmits a locking signal or an unlocking signal to said control module, the control module including a first electromagnet and a second electromagnet, wherein the control module moves the first element to an unlocking state via the first electromagnet when receiving said unlocking signal from the communication device, and wherein the control module moves the first element to a locking state via the second electromagnet when receiving said locking signal from the communication device; and a power module for supplying electrical energy to the control module, wherein when the first element is in the locking state and the electrical energy is no longer supplied, the second element drives the first element and thereby move the first element from the locking state to the unlocking state.

* * * * *